(12) United States Patent
Huang et al.

(10) Patent No.: US 9,229,309 B2
(45) Date of Patent: Jan. 5, 2016

(54) PROJECTION APPARATUS

(71) Applicants: Wei-Hao Huang, Hsinchu (TW);
Chao-Shun Chen, Hsinchu (TW);
Haw-Woei Pan, Hsinchu (TW)

(72) Inventors: Wei-Hao Huang, Hsinchu (TW);
Chao-Shun Chen, Hsinchu (TW);
Haw-Woei Pan, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 66 days.

(21) Appl. No.: 14/144,500

(22) Filed: Dec. 30, 2013

(65) Prior Publication Data
US 2014/0211171 A1    Jul. 31, 2014

(30) Foreign Application Priority Data
Jan. 29, 2013    (CN) .......................... 2013 1 0033865

(51) Int. Cl.
| | |
|---|---|
| G03B 21/26 | (2006.01) |
| G03B 21/28 | (2006.01) |
| G03B 21/14 | (2006.01) |
| H04N 9/31 | (2006.01) |
| G03B 37/04 | (2006.01) |
| G02B 27/10 | (2006.01) |

(52) U.S. Cl.
CPC ............ *G03B 21/28* (2013.01); *G02B 27/1066* (2013.01); *G03B 21/14* (2013.01); *G03B 21/26* (2013.01); *G03B 37/04* (2013.01); *H04N 9/3105* (2013.01); *H04N 9/3197* (2013.01)

(58) Field of Classification Search
CPC ..... H04N 9/3105; H04N 9/3197; G03B 21/26
USPC .......................... 353/7, 20, 30, 34, 37, 94, 99; 359/224.1, 317, 618, 629; 348/511, 348/513, 743–747; 349/5, 7–9, 57
See application file for complete search history.

(56) References Cited

U.S. PATENT DOCUMENTS

| | | | |
|---|---|---|---|
| 7,798,652 B2 | 9/2010 | Ikeda et al. | |
| 8,172,400 B2* | 5/2012 | O'Connell et al. | ............. 353/30 |
| 8,328,362 B2* | 12/2012 | Coleman | ................ G02B 27/26 349/18 |
| 8,403,488 B2* | 3/2013 | Schuck | ................ G02B 17/045 349/8 |

(Continued)

FOREIGN PATENT DOCUMENTS

| | | |
|---|---|---|
| CN | 1482488 | 3/2004 |
| JP | 2000171896 | 6/2000 |

(Continued)

OTHER PUBLICATIONS

"Office Action of Chinese Counterpart Application", issued on May 6, 2015, p. 1-p. 6.

*Primary Examiner* — Sultan Chowdhury
(74) *Attorney, Agent, or Firm* — Jianq Chyun IP Office

(57) ABSTRACT

The invention provides a projection apparatus having an image source, a projection lens, and a beam-splitting module. The image source provides an image beam, and the image beam includes a first sub image beam and at least one second sub image beam. The projection lens is disposed on a transmission path of the image beam. The beam-splitting module projects the first sub image beam passing through the beam-splitting module onto a first imaging plane, and projects the second sub image beam reflected by the beam-splitting module onto at least one second imaging plane. The first imaging plane is not coplanar with the at least one second imaging plane. The projection lens is disposed on the transmission path of the image beam between the beam-splitting module and the image source.

20 Claims, 10 Drawing Sheets

(56) References Cited

U.S. PATENT DOCUMENTS

| | | | |
|---|---|---|---|
| 8,690,337 B2 * | 4/2014 | Nishigaki et al. | 353/20 |
| 8,696,133 B2 * | 4/2014 | Imaoka et al. | 353/20 |
| 2008/0143965 A1 * | 6/2008 | Cowan et al. | 353/8 |
| 2010/0177403 A1 * | 7/2010 | Dolgoff | 359/629 |
| 2012/0206697 A1 | 8/2012 | Lee | |

FOREIGN PATENT DOCUMENTS

| | | |
|---|---|---|
| JP | 2009217019 | 9/2009 |
| TW | 201219850 | 5/2012 |

* cited by examiner

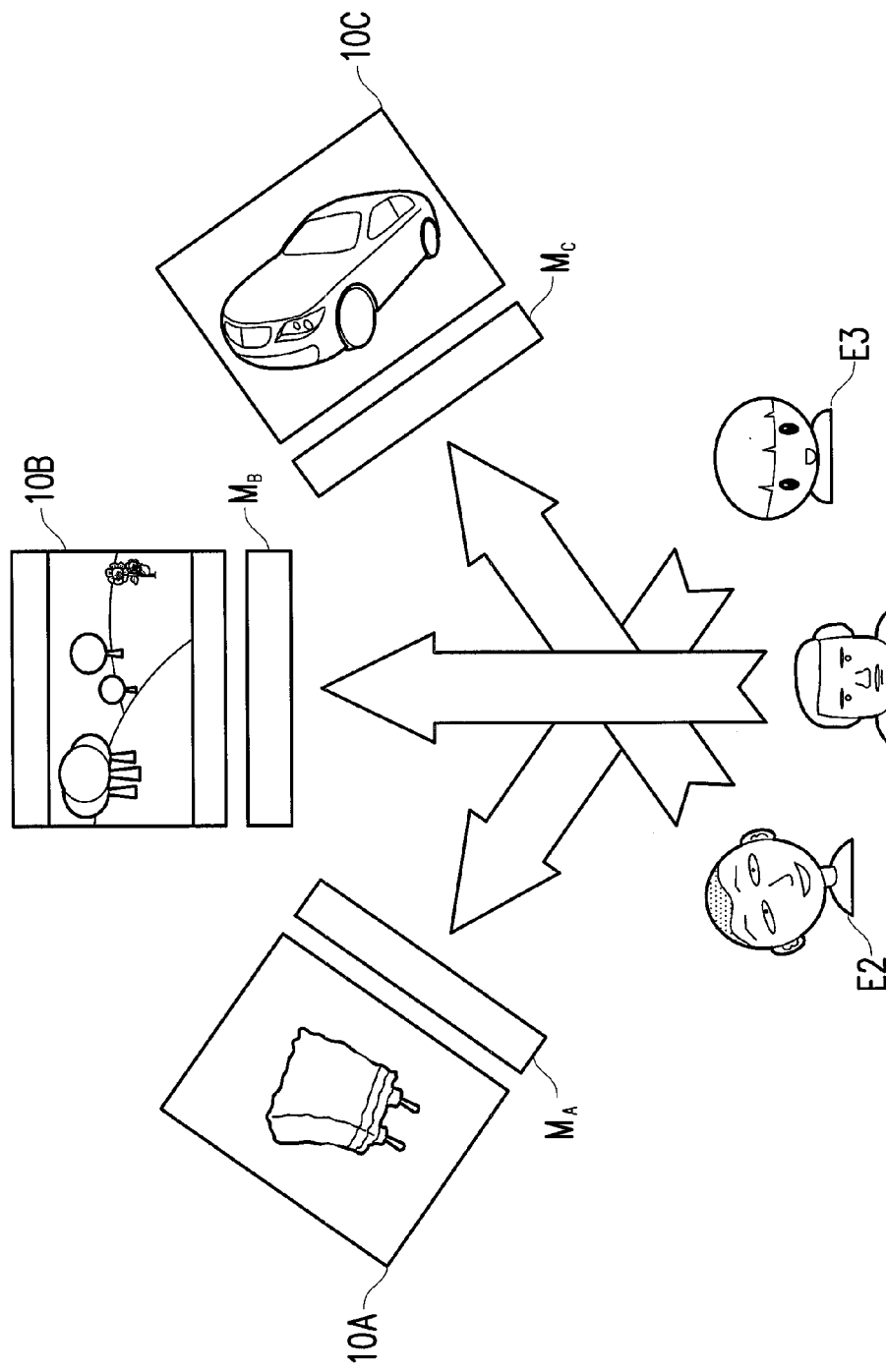

PROJECTION APPARATUS

CROSS-REFERENCE TO RELATED APPLICATION

This application claims the priority benefit of China application serial no. 201310033865.3, filed on Jan. 29, 2013. The entirety of the above-mentioned patent application is hereby incorporated by reference herein and made a part of this specification.

BACKGROUND OF THE INVENTION

1. Field of the Invention

The invention relates to a display apparatus, and more particularly to a projection apparatus.

2. Description of Related Art

A large-sized image would be displayed by utilizing a plurality of displays or a plurality of projection apparatuses in the market nowadays. For instance, the large-sized image is displayed together by a large-sized image apparatus assembled by a plurality of displays in an array, or projected by a plurality of projection apparatuses as to project a non-paralleled consecutive image in conventional art.

The projection apparatus is a relatively smaller apparatus capable of projecting a large-sized image having a size significantly larger than one displayed by an ordinary flat display. The large-sized image would be projected for a group viewing as to facilitate in conference meetings, report presentations, and lectures. Therefore, a major reason why the projection apparatus has been irreplaceable in the display field. Further, in recent years, the projection apparatus has also become an indispensable part of the home theater.

In order to generate the large-sized image such as an expansive larger-sized image stitched by M×N images, M×N projection apparatuses at different locations are utilized in conventional art to respectively project the M×N images, so as to display a plurality of non-coplanar images. However, utilizing the M×N projection apparatuses means that an overall size thereof is increased by more than M×N times while the costs are increased by at least M×N times.

In addition, the invention is related to conventional technologies as disclosed in U.S. Pat. No. 7,798,652, U.S. Patent Publication No. 2012/0206697 and Taiwan Patent Publication No. 201219850. Accordingly, how to effectively lower the cost for providing a plurality of images which are not coplanar has become an important issue to be solved for the manufacturers.

SUMMARY OF THE INVENTION

The invention is directed to a projection apparatus capable of providing an image having non-coplanar images to be respectively projected onto different imaging planes.

Other objects and advantages of the invention can be further illustrated by the technical features broadly embodied and described as follows.

In order to achieve one or a part of or all of the above advantages or other advantages, an embodiment of the invention provides a projection apparatus having an image source, a projection lens, and a beam-splitting module. The image source provides an image beam, and the image beam includes a first sub image beam and at least one second sub image beam. The projection lens is disposed on the transmission path of the image beam. The beam-splitting module projects the first sub image beam passing through the beam-splitting module along an optical axis of the projection lens onto a first imaging plane, and projects the at least one second sub image beam reflected by the beam-splitting module onto at least one second imaging plane. The first imaging plane is not coplanar with the at least one second imaging plane, and the projection lens is disposed on the transmission path of the image beam between the beam-splitting module and the image source.

According to an embodiment of the invention, the first imaging plane includes a curved plane or a flat plane.

According to an embodiment of the invention, the second imaging plane includes a curved plane or a flat plane.

According to an embodiment of the invention, the projection apparatus further includes a first lens group. The first lens group is disposed on a transmission path of the first sub image beam, and located between the projection lens and the first imaging plane.

According to an embodiment of the invention, the beam-splitting module includes at least one reflector, and the reflector is disposed on a transmission path of the second sub image beam for altering a transmission direction of the second sub image beam.

According to an embodiment of the invention, the beam-splitting module includes at least one reflector and at least one second lens group. The reflector is disposed on the transmission path of the second sub image beam for altering the transmission direction of the second sub image beam, and the second lens group is disposed on the transmission path of the second sub image beam.

According to an embodiment of the invention, the first imaging plane and the second imaging plane are adjacent to each other.

According to an embodiment of the invention, the first imaging plane and the second imaging plane are separated from each other.

According to an embodiment of the invention, the beam-splitting module is a movable beam-splitting module.

According to an embodiment of the invention, the image source includes an illumination system and a display plane. The illumination system is configured for providing an illumination beam. The display plane is disposed on a transmission path of the illumination beam, and located between the projection lens and the illumination system. The first sub image beam is corresponded to an image displayed by a region on a portion of the display plane, and the second sub image beam is corresponded to an image displayed by a region on another portion of the display plane.

Based on above, the image beam passing through the beam-splitting module may be divided into a first sub image beam and at least one second sub image beam. The first sub image beam may be projected onto a first imaging plane, the at least one second sub image beam may be reflected by the beam-splitting module to be projected onto the at least one second imaging plane, and the second imaging plane and the first imaging plane are not coplanar to each other. Accordingly, the embodiment may provide a projection apparatus to project an image composed by a plurality of non-coplanar images.

BRIEF DESCRIPTION OF THE DRAWINGS

To make the above features and advantages of the invention more comprehensible, several embodiments accompanied with drawings are described in detail as follows.

FIG. 1E and FIG. 1F are schematic views for displaying images projected by the projection apparatus according to an embodiment of the invention.

DESCRIPTION OF THE EMBODIMENTS

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1A:
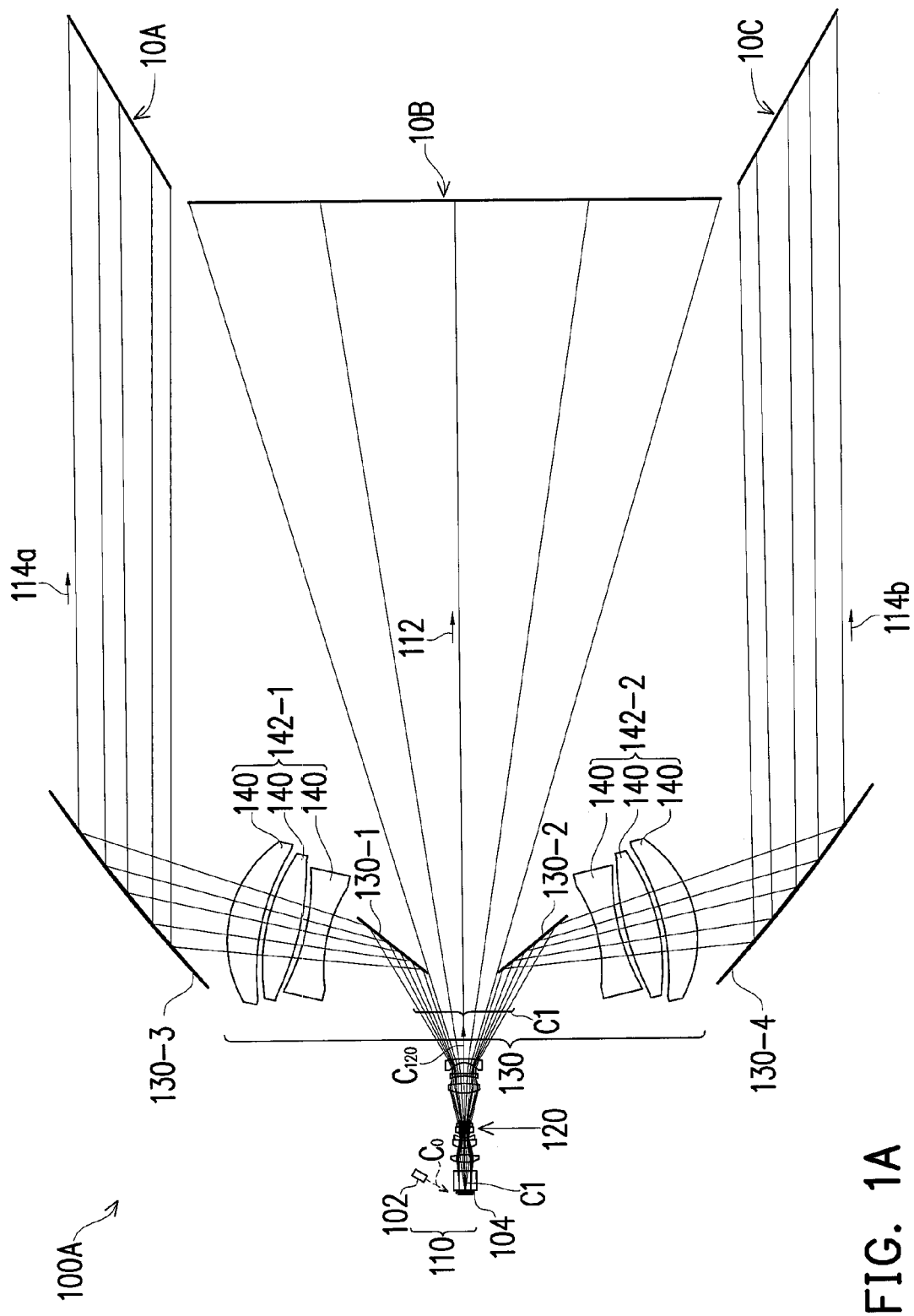
FIG. 1A is a schematic view of the projection apparatus according to an embodiment of the invention.

Referring to FIG. 1A, a projection apparatus 100A of the embodiment includes an image source 110, a projection lens 120, and a beam-splitting module 130. In the embodiment, the projection apparatus 100A is configured to project an image beam C1 onto a first imaging plane 10B and at least one second imaging plane. It is illustrated with two of the second imaging planes 10A and 10C herein as an example, but a number of the second imaging plane is not limited to two.

Figure 1B:
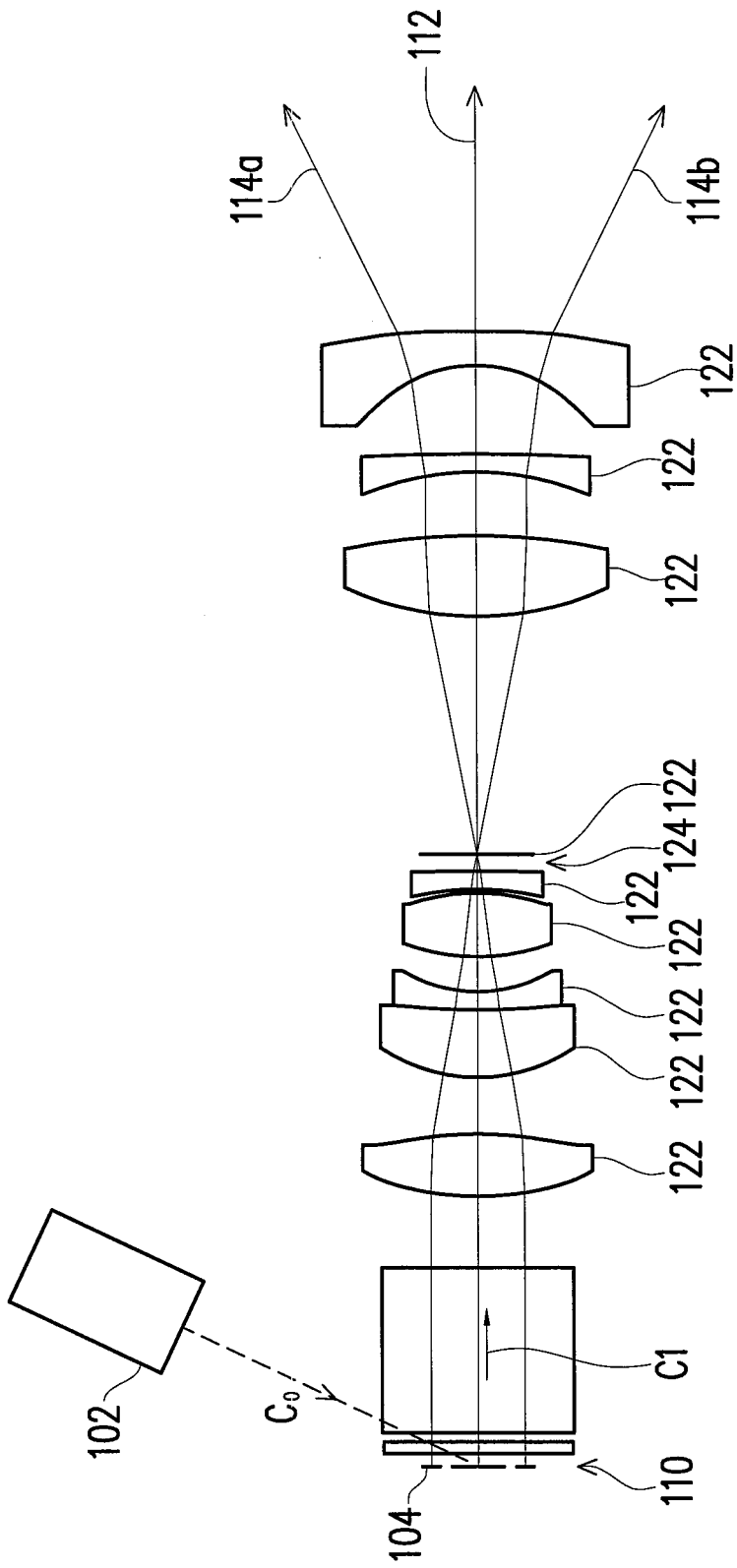
FIG. 1B is a partial enlarged view of the image source and the projection lens depicted in FIG. 1A.

Referring to FIG. 1A and FIG. 1B, in the embodiment, the image source 110 provides the image beam C1, and the image beam C1 includes a first sub image beam 112 and at least one second sub image beam. The second sub image beams may be illustrated with two second sub image beams 114a and 114b herein as an example. In addition, the first sub image beam 112 is projected by the projection lens 120 onto the first imaging plane 10B, the second sub image beams 114a and 114b are projected by the projection lens 120 onto the second imaging planes 10A and 10C, respectively. More specifically, the image source 110 may include an illumination system 102 and a display plane 104, and the illumination system 102 is configured to provide an illumination beam Co. The display plane 104 is disposed on a transmission path of the illumination beam Co, and located between the projection lens 120 and the illumination system 102 for converting the illumination beam Co into the image beam C1.

Figure 1C:
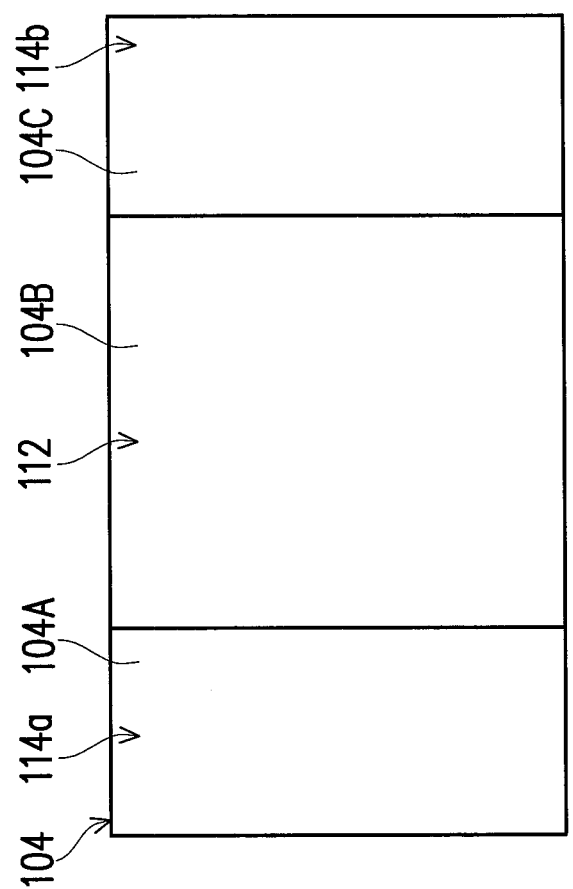
FIG. 1C is a schematic view of the display plane according to an embodiment of the invention.

Referring to FIG. 1A to FIG. 1C, in the image beam C1, the first sub image beam 112 is corresponded to an image displayed by a region 104B of a portion of the display plane 104, and the second sub image beams 114a and 114b are respectively corresponded to images displayed by regions 104A and 104C of another portion of the display plane 104. In the embodiment, the image displayed by the region 104B of the display plane 104 and the images displayed by the regions 104A and 104C of the display plane 104 may be stitched into an entire image. According to other embodiments, in the display plane 104, the image displayed by the region 104B and the images displayed by the regions 104A and 104C may not be stitched into the entire image. More specifically, an image displayed on the display plane 104 may be divided into a plurality of sub images, and each of the sub images may be respectively provided by the regions 104A, 104B, and 104C, and the sub images may come from different portions of the same image source, so that the display plane 104 may display the entire image. Alternatively, the sub images may come from different image sources, so that the different individual sub images may be respectively displayed onto different regions of the display plane 104. It is noted that, a number of the region for displaying each sub image of the display plane 104 and a region size occupied by each region are not limited by the embodiment.

In addition, the display plane 104 of the embodiment may be, for example, a digital micro-mirror device (DMD), a liquid-crystal-on-silicon panel (LCOS panel), a transmissive liquid crystal panel or other appropriate spatial light modulators. However, in other embodiments, the image source 100 may also be a self-luminous display emitting the image beam by itself, and the self-luminous display may be, for example, a light-emitting diode (LED) array display, an organic LED array display, a field emission display, a plasma display or other appropriate self-luminous displays.

Referring to FIG. 1A and FIG. 1B, the projection lens 120 is disposed on a transmission path of the image beam C1. The projection lens 120 may include a plurality of lenses 122 and an aperture stop 124. By utilizing the projection lens 120, the image beam C1 may be projected onto the beam-splitting module 130, and the aperture stop 124 may control a light quantity of the image beam C1 being projected onto the beam-splitting module 130.

The beam-splitting module 130 is disposed on the transmission path of the image beam C1 behind the projection lens 120, namely, the projection lens 120 is disposed on the transmission path of the image beam C1 between the beam-splitting module 130 and the image source 110. More specifically, the first sub image beam 112 is projected onto the first imaging plane 10B after passing through the beam-splitting module 130. In the embodiment, the first sub image beam 112 is, for example, projected onto the first imaging plane 10B along an optical axis $C_{120}$ of the projection lens 120, but the invention is not limited thereto. In addition, the second sub image beams 114a and 114b are projected respectively onto the second imaging planes 10A and 10C after being reflected by the beam-splitting module 130, and the first imaging plane 10B is not coplanar with the second imaging planes 10A and 10C. That is, taking the first imaging plane 10B and the second imaging planes 10A and 10C in terms of a flat plane for example, any one normal vector of the first imaging plane 10B and the second imaging planes 10A and 10C may not be parallel to any other normal vectors of the rest of the first imaging plane 10B and the second imaging planes 10A and 10C. This means that any two normal vectors of the first imaging plane 10B and the second imaging planes 10A and 10C may not be parallel to one another. However, in other embodiments, the first imaging plane 10B and the second imaging planes 10A and 10C may also be curved planes. In addition, the first imaging plane 10B and the second imaging planes 10A and 10C may be projected onto adjacent screens, so that the images displayed by the first imaging plane 10B and the second imaging planes 10A and 10C may be adjacent to each other. Alternatively, the first imaging plane 10B and the second imaging planes 10A and 10C may also be projected onto non-adjacent screens, so that the images displayed by the first imaging plane 10B and the second imaging plane 10A and 10C may be separated from each other. It is noted that, a number of the second imaging plane is not limited by the embodiment, namely, when the beam-splitting module 130 reflects the image beam C1 into a plurality of second sub image beams, the second sub image beams reflected by the beam-splitting module 130 may be projected respectively onto the plurality of second imaging planes other than the first imaging plane, and at least one portion of the second imaging planes is also not coplanar with the first imaging plane.

Figure 1D:
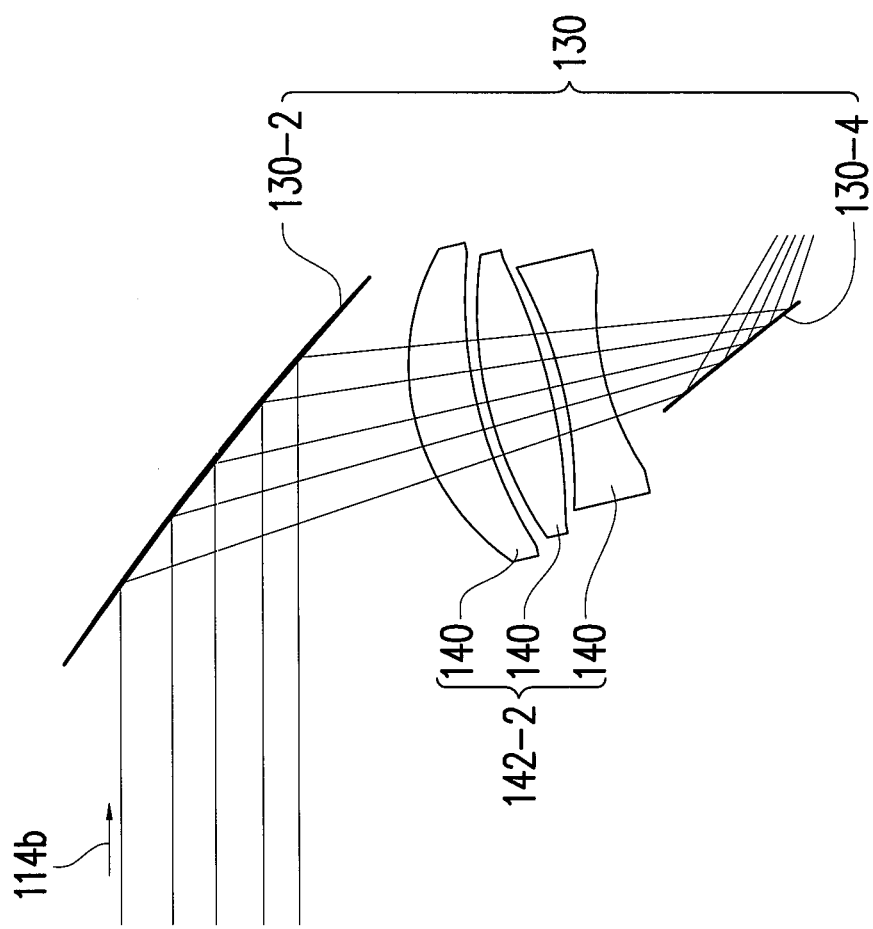
FIG. 1D is a partially enlarged schematic view illustrating the beam-splitting module depicted in FIG. 1A.

Referring to FIGS. 1A and 1D, the beam-splitting module 130 may include at least one reflector, it is illustrated with reflectors 130-1 to 130-4 herein as an example, the reflectors 130-1 and 130-3 are disposed on a transmission path of the second sub image beam 114a for altering a transmission direction of the second sub image beam 114a, and the reflectors 130-2 and 130-4 are disposed on a transmission path of the second sub image beam 114b for altering a transmission direction of the second sub image beam 114b.In the embodiment, the reflector may be a reflecting mirror, but the invention is not limited thereto. In addition, although the embodiment is illustrated with four reflectors as an example in FIG. 1A, a number of the reflector is not limited by the embodiment. For instance, in case when one or more second sub image beam is present, the embodiment may include one or more reflector for altering the transmission path/direction of the second sub image beam.

In addition, the beam-splitting module 130 according to the embodiment may also selectively include at least one lens group, it is illustrated with the lens groups 142-1 and 142-2 herein as an example, the lens group 142-1 is disposed on the transmission path of the second sub image beam 114a, the lens group 142-2 is disposed on the transmission path of the second sub image beam 114b, and the lens groups 142-1 and 142-2 may respectively include a plurality of lenses 140. In the embodiment, the lens groups 142-1 and 142-2 (e.g., the lens group 142-2 depicted in FIG. 1D) may respectively adjust lengths of optical paths of the second sub image beams 114a and 114b (e.g., the second sub image beam 114b depicted in FIG. 1D) projected by the projection lens 120 and transmitted to the reflectors 130-1 to 130-4. Accordingly, magnifications of the second imaging planes 10A and 10B may be adjusted, and the optical properties of the projection apparatus 100 may also be compensated. In addition, although the embodiment is illustrated with two of the lens groups respectively having three lenses as an example in FIG. 1A, a number of the lens group and a number of the lens in the lens group are not limited by the embodiment.

It should be noted that, the beam-splitting module 130 according to the embodiment may be, for example, a movable beam-splitting module. In other words, in case when screens for displaying the second imaging planes 10A and 10C move, each of the reflectors 130-1 to 130-4 in the beam-splitting module 130 may move with the screens synchronously. For instance, when the second imaging plane 10A rotates in counterclockwise, the reflectors 130-1 and/or 130-3 may also be rotated synchronously, so that the second sub image beam 114a may be projected onto the second imaging plane 10A rotated in counterclockwise. Similarly, when the second imaging plane 10C rotates in clockwise, the reflectors 130-2 and/or 130-4 may also be rotated synchronously, so that the second sub image beam 114b may be projected onto the second imaging plane 10C rotated in clockwise. Accordingly, in case when the second imaging planes 10A and 10C are not coplanar to each other, the beam-splitting module 130 may adjust disposition of each of the reflectors 130-1 to 130-4 correspondingly, so that the second sub image beams 114a and 114b may be reflected by the beam-splitting module 130 to be projected respectively onto the second imaging planes 10A and 10C.

It should also be noted that, the projection apparatus 100 according to the embodiment may project the first sub image beam 112 of the image beam C1 onto the first imaging plane 10B, and the beam-splitting module 130 may reflect the second sub image beams 114a and 114b of the image beam C1 onto to the second imaging planes 10A and 10C which are not coplanar with the first imaging plane 10B. Therefore, the projection apparatus 100A is capable of projecting a plurality of image images which are not coplanar, so as to provide users with a better viewing pleasure.

Figure 1E:
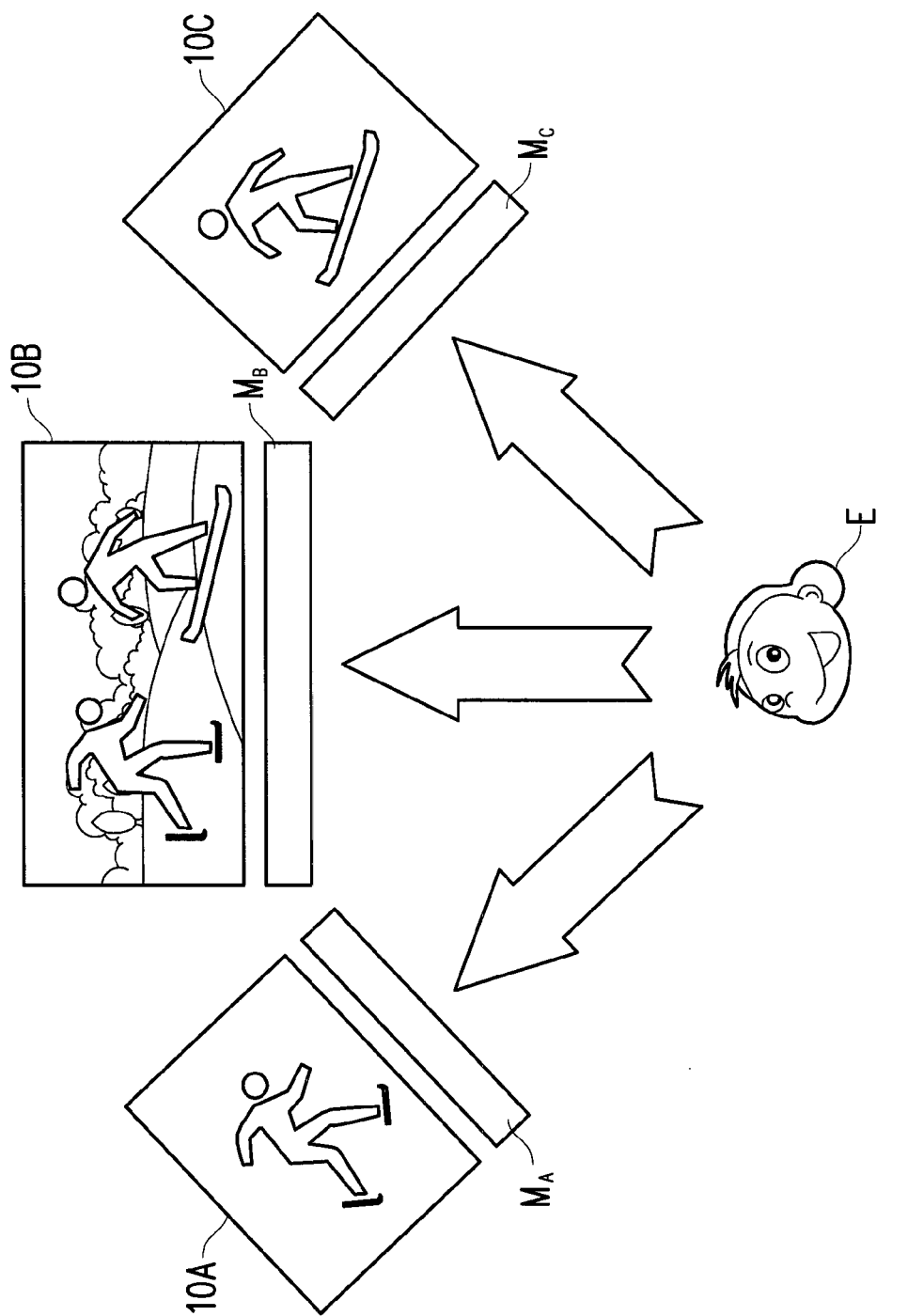

Referring to FIG. 1A and FIG. 1E, with respect to the imaging planes projected by the projection apparatus 100A, the first imaging plane 10B may be, for example, located on a screen $M_B$, the second imaging plane 10A may be, for example, located on a screen $M_A$, and the second imaging plane 10C may be, for example, located on a screen $M_C$. According to the embodiment, the first sub image beam 112, the second sub image beams 114a and 114b of the image beam C1 are projected by the projection lens 120 onto the screens $M_B$, $M_A$, and $M_C$, respectively. Therefore, the first imaging plane 10B located on the screen $M_B$ may show a portion of the image from the image source, and the second imaging planes 10A located on the screen $M_A$ and the second imaging planes 10C located on the screen $M_C$ may respectively display another portion of the image from the image source. In addition, since the first imaging plane 10B is not coplanar with the second imaging planes 10A and 10C, the screens $M_A$ and $M_C$ may display the image in different angles. Accordingly, a user E may view one portion of the entire image respectively from the screens $M_A$, $M_B$, and $M_C$.

On the other hand, in case when the image source 110 provides a plurality of individual images, the first sub image beam 112 and the second sub image beams 114a and 114b may respectively project the individual images to the projection lens 120, and the beam-splitting module 130 may project the first sub image beam 112, the second sub image beams 114a and 114b along different transmission directions respectively onto the screens $M_B$, $M_A$, and $M_C$. Accordingly, the first imaging plane 10B located on the screen $M_B$ as well as the second imaging plane 10A located on the screens $M_A$ and the second imaging plane 10B located on the screens $M_C$ may display the corresponding one of the individual images, respectively. Particularly as depicted in FIG. 1F, viewers E1, E2, and E3 located at different locations may view the different individual images on the screens $M_B$, $M_C$, and $M_A$ respectively from different angles.

Based on above, in the projection apparatus 100A according to the embodiment, the beam-splitting module 130 may divide the image beam C1 into the first sub image beam 112 and the second sub image beams 114a and 114b, wherein the first sub image beam 112 passing through the beam-splitting module 130 may be projected onto the first imaging plane 10B along the optical axis $C_{120}$ of the projection lens 120, and the beam-splitting module 130 may alter the transmission directions of the second sub image beams 114a and 114b, so that the sub image beams 114a and 114b may be projected onto the second imaging planes 10A and 10C which are respectively located at two sides of the first imaging plane 10B. However, in other embodiments, the beam-splitting module 130 may also alter the transmission direction of the first sub image beam 112, so that the first sub image beam 112 may not be projected onto a location on an extend line of the optical axis $C_{120}$ of the projection lens 120. For instance, the beam-splitting module may, for example, divide the image beam into two sub image beams, and transmission directions of the two sub image beams may be altered by the beam-splitting module to be projected onto two imaging planes which are not coplanar to each other. Accordingly, the embodiment provides a projection apparatus 100A to project a stitching image composed by a plurality of images, and each of the images may not be coplanar. Accordingly, the projection apparatus according to the embodiment may lower the cost for projecting the plurality of images while providing the better viewing pleasure to the users.

Embodiments below are served to further describe the embodiment in detail for the person skilled in the art as to further understand the projection apparatus of the invention. Therein, the image source, the projection lens are similar to the components depicted in FIG. 1A, thus related description is omitted hereinafter.

Figure 2:
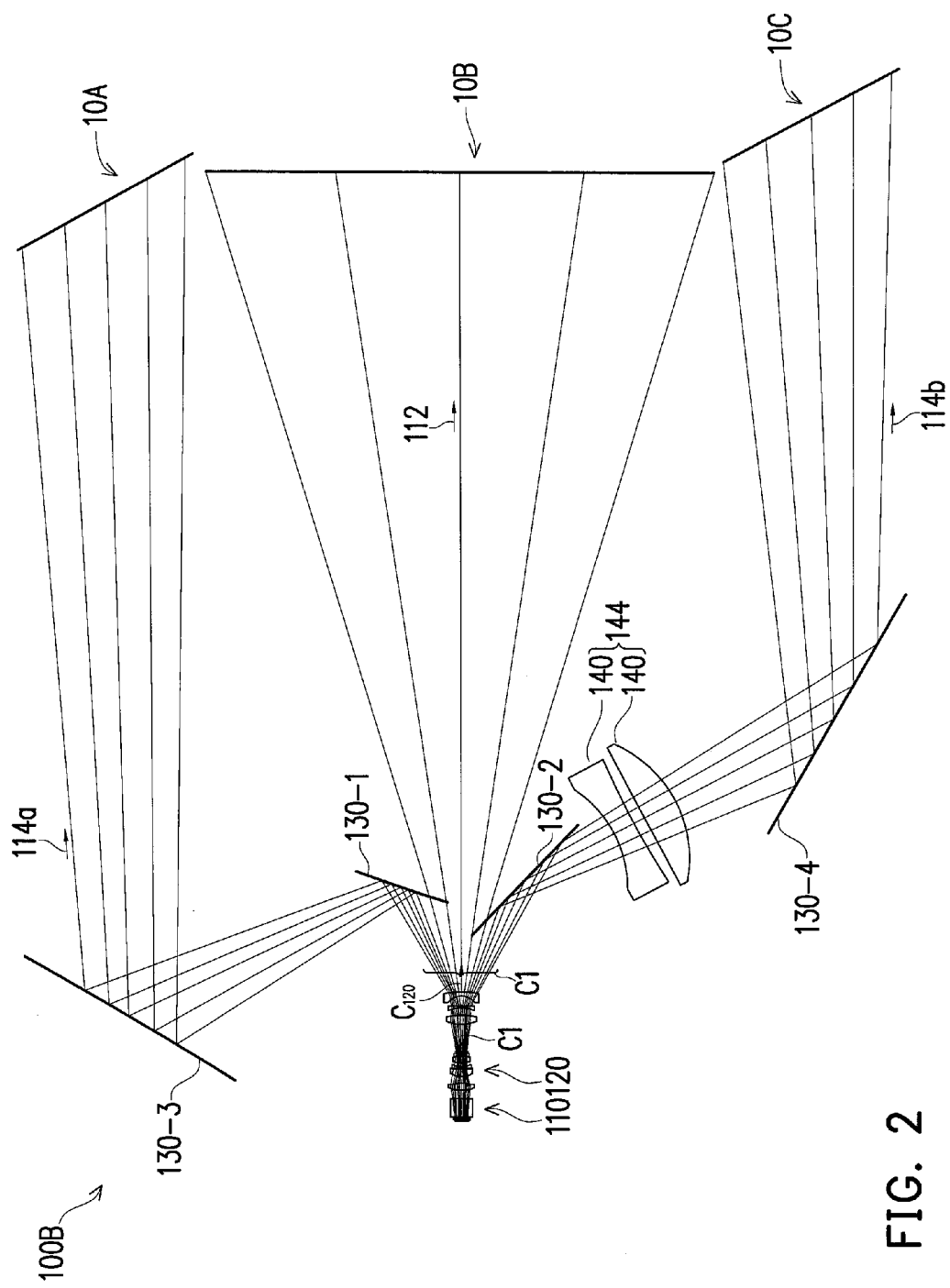
FIG. 2 is a schematic view of the projection apparatus according to another embodiment of the invention.

Referring to FIG. 2 and FIG. 1A, a projection apparatus 100B of the embodiment is similar to the projection apparatus 100A depicted in FIG. 1A, their major differences are: the projection apparatus 100B includes a lens group 144, the lens group 144 is disposed on the transmission path of the second sub image beam 114b and located between the projection lens 120 and the second imaging plane 10C, and the lens group 144 may be, for example, disposed between the reflectors 130-2 and 130-4. Accordingly, the length of the optical path of the second sub image beam 114b may be extended as to adjust the magnification of the second imaging plane 10C. In addition, the reflector 130-3 is disposed between the reflector 130-1 and the second imaging plane 10A, and the reflector 130-3 is disposed on the transmission path of the second sub image beam 114a. Accordingly, in the embodiment, the length of the optical path of the second sub image beam 114a between the reflector 130-1 and the second imaging plane 10A may be increased, so as to adjust the magnification of the second imaging plane 10A. Accordingly, by utilizing the reflectors 130-1 to 130-4 with the lens group 144, the normal vectors of the first imaging plane 10B and the second imaging planes 10A and 10C may not be coplanar with each other, and the first imaging plane and the second imaging plane 10A and 10C may not be coplanar. It is noted that in the embodiment, it is illustrated in FIG. 2 with the lens group 144 having two lenses 140 as an example, but a number of the lens group and a number of the lens between each reflector are not limited by the embodiment. For instance, a plurality of lens group having different numbers of the lens may be provided between each reflector. Moreover, location for disposing the lens group is also not limited by the embodiment. For instance, in case when the beam-splitting module 130 includes other reflectors, a plurality of lens groups may also be disposed between the other reflectors in the embodiment.

Figure 3:
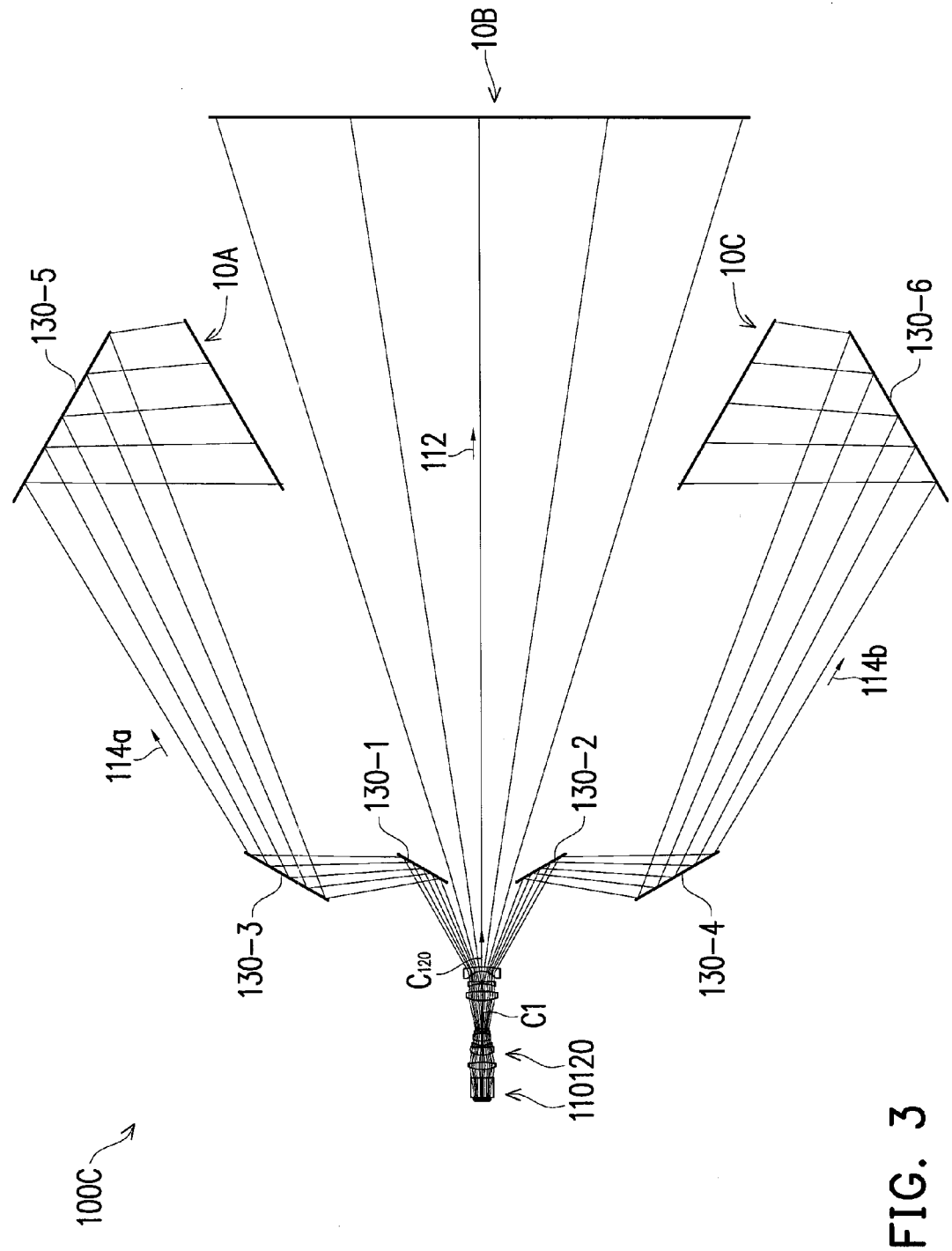
FIG. 3 is a schematic view of the projection apparatus according to another embodiment of the invention.

Referring to FIG. 3 and FIG. 1A, a projection apparatus 100C of the embodiment is similar to the projection apparatus 100A depicted in FIG. 1A, their major differences are: there may be no lens group disposed in the projection apparatus 100C, and the beam-splitting module 130 further includes reflectors 130-5 and 130-6, the reflector 130-5 is disposed on the transmission path of the second sub image beam 114a and located between the reflector 130-3 and the second imaging plane 10A, and the reflector 130-6 is disposed on the transmission path of the second sub image beam 114b and located between the reflector 130-4 and the second imaging plane 10C. In the embodiment, the second sub image beam 114a may be reflected by the reflectors 130-1, 130-3, and 130-5 sequentially to be projected onto the second imaging plane 10A, and the second sub image beam 114b may be reflected by the reflectors 130-2, 130-4, and 130-6 sequentially to be projected onto the second imaging plane 10C, and the first sub image beam 112 may pass the beam-splitting module 130 to be projected onto the first imaging plane 10B. Therein, the second imaging planes 10A and 10C are located between the projection lens 120 and the first imaging plane 10B, and the second imaging planes 10A and 10C and the first imaging plane 10B may be located on different planes. Accordingly, by altering disposition of the reflectors 130-1 to 130-6 in the beam-splitting module 130, the second sub image beams 114a and 114b may be respectively projected onto the second imaging planes 10A and 10C along different optical paths. Accordingly, the second imaging planes 10A and 10C may be located on different planes, and the second imaging planes 10A and 10C may not be coplanar with the first imaging plane 10B, either.

Figure 4:
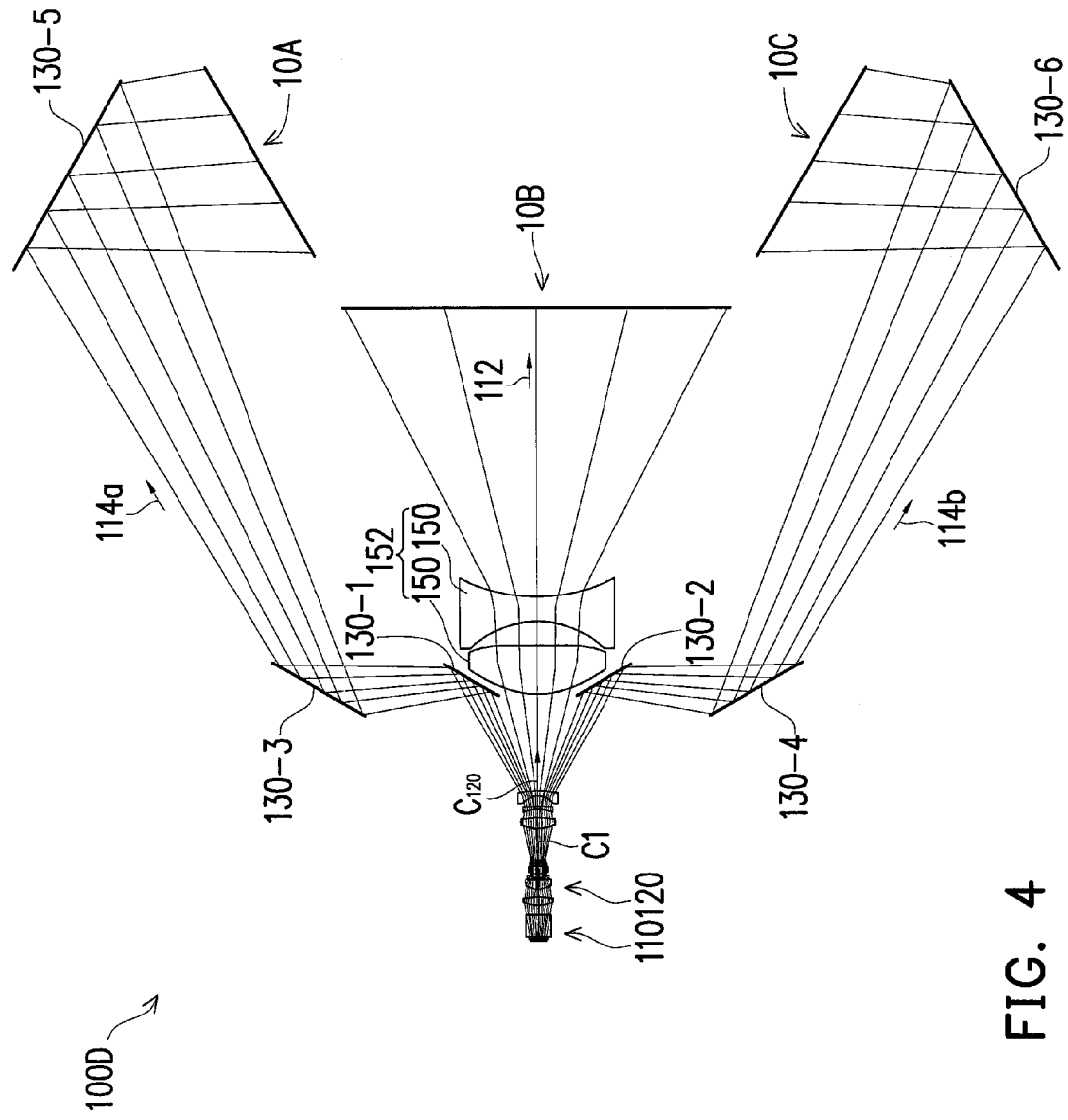
FIG. 4 is a schematic view of the projection apparatus according to another embodiment of the invention.

Referring to FIG. 4 and FIG. 3, a projection apparatus 100D of the embodiment is similar to the projection apparatus 100C depicted in FIG. 3, their major differences are: the projection apparatus 100D may include a lens group 152, the lens group 152 has two lenses 150, but a number of the lens is not limited by the embodiment. The lens group 152 is disposed on a transmission path of the first sub image beam 112, and located between the projection lens 120 and the first imaging plane 10B. In the embodiment, the lens group 150 may, for example, adjust a length of an optical path of the first sub image beam 112 projected onto the first imaging plane 10B along the optical axis $C_{120}$ of the projection lens 120, so as to adjust the magnification of the first imaging plane 10B. For instance, the lens group 150 may reduce the length of the optical path of the first sub image beam 112, so that the first imaging plane 10B may be closer to the projection lens 120 compared to the second imaging planes 10A and 10C. Accordingly, by utilizing the reflectors 130-1 to 130-6 with the lens group 150, the first imaging plane 10B and the second imaging planes 10A and 10C may also be located on different planes. However, in other embodiments, by utilizing the lens group 150, the first sub image beam 112 may also be projected onto the first imaging plane 10B without following along the optical path $C_{120}$ of the projection lens 120.

Figure 5:
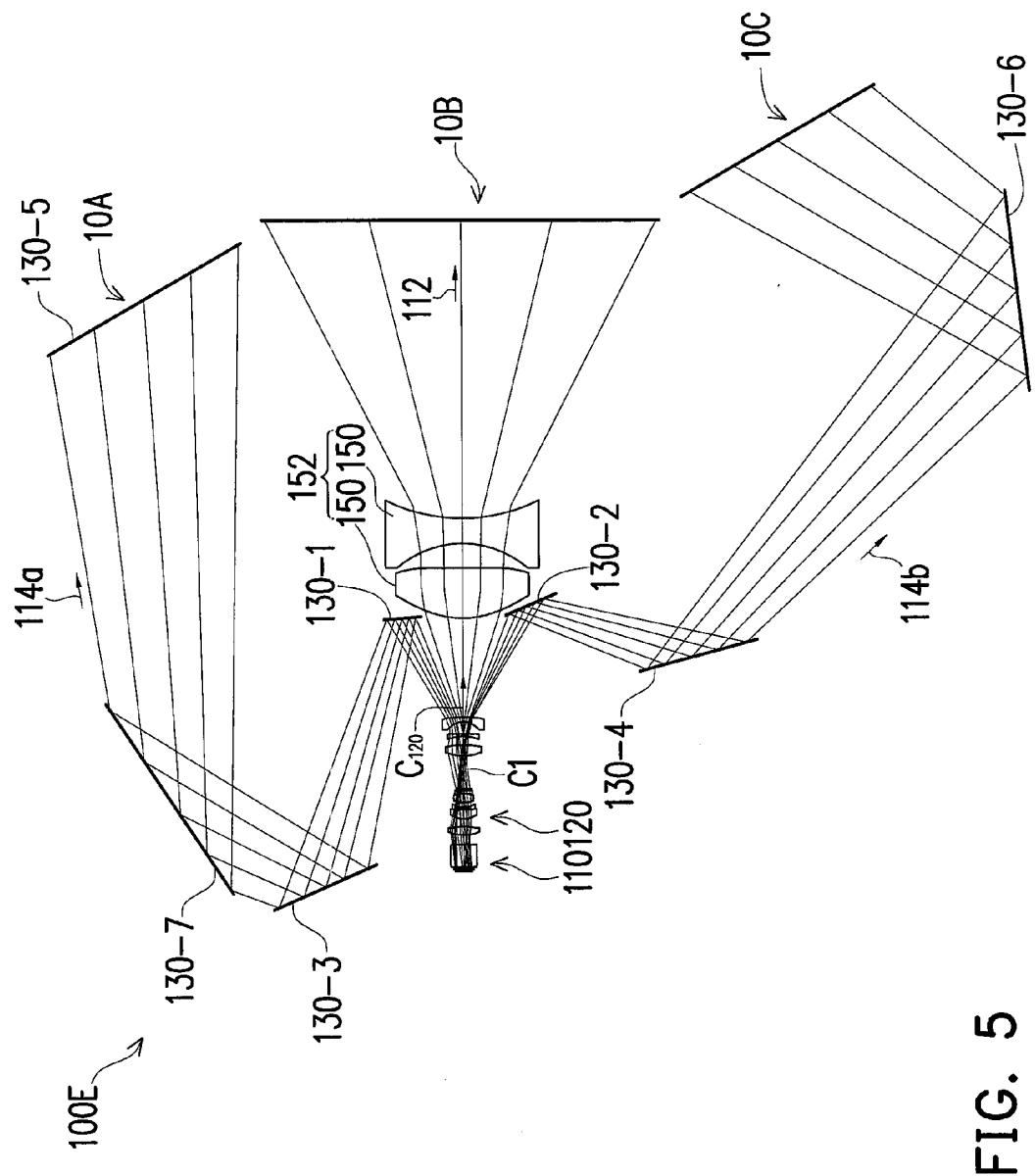
FIG. 5 is a schematic view of the projection apparatus according to another embodiment of the invention.

Referring to FIG. 4 and FIG. 5, a projection apparatus 100E of the embodiment is similar to the projection apparatus 100D depicted in FIG. 4. In the embodiment, the beam-splitting module 130 of the projection apparatus 100E further includes a reflector 130-7, and the reflector 130-7 is disposed on the transmission path of the second sub image beam 114a, and located between the reflector 130-3 and the second imaging plane 10A. In the embodiment, the second sub image beam 114a may be reflected by the reflectors 130-1, 130-3, 130-7, and 120-5 sequentially to be projected onto the second imaging plane 10A, and the second sub image beam 114b may be reflected by the reflectors 130-2, 130-4, and 130-6 sequentially to be projected onto the second imaging plane 10C, and the first sub image beam 112 may be projected by the projection lens 120 onto the first imaging plane 10B. It is noted that, the lens group 150 may reduce the length of the optical path of the first sub image beam 112, and the second sub image beams 114a and 114b may be respectively projected onto the second imaging planes 10A and 10C along different optical paths by altering disposition of the reflectors 130-1 to 130-7 in the beam-splitting module 130. Accordingly, by utilizing the lens group 150 with the reflectors 130-1 to 130-7, the first imaging plane 10B and the second imaging planes 10A and 10C may be adjacent to each other, and each of the second imaging planes 10A and 10C may not be coplanar with the first imaging plane 10B.

In view of above, the projection apparatus according to the embodiments of the invention may achieve at least one the feature as listed below. In the projection apparatus according to the embodiment of the invention, the image beam passing through the beam-splitting module may be divided into a first sub image beam and at least one second sub image beam. The first sub image beam may be projected onto a first imaging plane directly facing a projection lens, the second sub image beam may be directed by the beam-splitting module to a transmission direction different from a transmission direction of the first sub image beam and projected onto at least one second imaging plane located onto two sides of the first imaging plane, and the first imaging plane and the second imaging plane are not coplanar to each other. Accordingly, the embodiment provides a projection apparatus to project a stitching image composed by a plurality of images, and each of the images may be located on different planes. Accordingly, the projection apparatus according to the embodiment of the invention may lower the cost for projecting the plurality of images while providing a better viewing pleasure to the users.

The embodiments described are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the present invention. In addition, the terms such as "first", "second" as recited in the specification or the claims are intended to give the elements names or distinguish different embodiments or scopes, the maximum number or the minimum number of the elements is not limited thereto.

What is claimed is:

1. A projection apparatus, comprising:
   an image source for providing an image beam, wherein the image beam comprises a first sub image beam and at least one second sub image beam;
   a projection lens disposed on a transmission path of the image beam;
   a beam-splitting module for projecting the first sub image beam passing through the beam-splitting module onto a first imaging plane and projecting the second sub image beam reflected by the beam-splitting module onto at least one second imaging plane, wherein the projection lens is disposed on the transmission path of the image beam between the beam-splitting module and the image source; and
   at least one lens group disposed on at least one of a transmission path of the first sub image beam and a transmission path of the second sub image beam for adjusting a length of an optical path corresponding to the at least one of the transmission path of the first sub image beam and the transmission path of the second sub image beam projected by the projection lens, so as to adjust a magnification of an image projected onto at least one of the first imaging plane and the second imaging plane.

2. The projection apparatus of claim 1, wherein the first imaging plane comprises a curved plane or a flat plane.

3. The projection apparatus of claim 1, wherein the second imaging plane comprises a curved plane or a flat plane.

4. The projection apparatus of claim 1, wherein the at least one lens group comprises a first lens group disposed on the transmission path of the first sub image beam and is located between the projection lens and the first imaging plane.

5. The projection apparatus of claim 1, wherein the beam-splitting module comprises at least one reflector disposed on a transmission path of the second sub image beam for altering a transmission direction of the second sub image beam.

6. The projection apparatus of claim 1, wherein the beam-splitting module comprises at least one reflector disposed on the transmission path of the second sub image beam for altering a transmission direction of the second sub image beam, and the at least one lens group comprises at least one second lens group disposed on the transmission path of the second sub image beam.

7. The projection apparatus of claim 1, wherein the first imaging plane and the second imaging plane are adjacent to each other.

8. The projection apparatus of claim 1, wherein the first imaging plane and the second imaging plane are separated from each other.

9. The projection apparatus of claim 1, wherein the beam-splitting module is a movable beam-splitting module.

10. The projection apparatus of claim 1, wherein the image source comprises:
    an illumination system configured for providing an illumination beam; and
    a display plane disposed on a transmission path of the illumination beam, and located between the projection lens and the illumination system, wherein the first sub image beam is corresponded to an image displayed by a region on a portion of the display plane, and the second sub image beam is corresponded to an image displayed by a region on another portion of the display plane.

11. A projection apparatus, comprising:
    an image source for providing an image beam, wherein the image beam comprises a first sub image beam and at least one second sub image beam, the first sub image beam is corresponded to an image displayed by a first region of a display plane of the image source, the at least one second sub image beam is corresponded to an image displayed by at least one second region of the display plane, and the image displayed by the first region and the image displayed by the at least one second region of the display plane are different individual images;
    a projection lens disposed on a transmission path of the image beam; and
    a beam-splitting module for projecting the first sub image beam passing through the beam-splitting module onto a first imaging plane and projecting the second sub image beam reflected by the beam-splitting module onto at least one second imaging plane, wherein the projection lens is disposed on the transmission path of the image beam between the beam-splitting module and the image source.

12. The projection apparatus of claim 11, wherein the first imaging plane comprises a curved plane or a flat plane.

13. The projection apparatus of claim 11, wherein the second imaging plane comprises a curved plane or a flat plane.

14. The projection apparatus of claim 11, wherein the at least one lens group comprises a first lens group disposed on the transmission path of the first sub image beam and is located between the projection lens and the first imaging plane.

15. The projection apparatus of claim 11, wherein the beam-splitting module comprises at least one reflector disposed on a transmission path of the second sub image beam for altering a transmission direction of the second sub image beam.

16. The projection apparatus of claim 11, wherein the beam-splitting module comprises at least one reflector disposed on the transmission path of the second sub image beam for altering a transmission direction of the second sub image beam, and the at least one lens group comprises at least one second lens group disposed on the transmission path of the second sub image beam.

17. The projection apparatus of claim 11, wherein the first imaging plane and the second imaging plane are adjacent to each other.

18. The projection apparatus of claim 11, wherein the first imaging plane and the second imaging plane are separated from each other.

19. The projection apparatus of claim 11, wherein the beam-splitting module is a movable beam-splitting module.

20. The projection apparatus of claim 11, wherein the image source further comprises an illumination system configured for providing an illumination beam, and the display plane is disposed on a transmission path of the illumination beam and located between the projection lens and the illumination system.

\* \* \* \* \*